United States Patent
Gottschall

[15] 3,696,982
[45] Oct. 10, 1972

[54] FILM-DRIVING ROLLER WITH DEVICE FOR STOPPING THE DRIVE MECHANISM IF THE FILM IS OVERLOADED

[72] Inventor: Gernot Gottschall, Boblingen, Germany

[73] Assignee: Firma Franz Morat GmbH, Stuttgart-Vaihingen, Germany

[22] Filed: Dec. 2, 1970
[21] Appl. No.: 94,457

[30] Foreign Application Priority Data

Jan. 8, 1970 Germany.........P 20 00 612.6

[52] U.S. Cl................................226/25, 352/174
[51] Int. Cl. ..............................B65h 25/00
[58] Field of Search.....................352/180–182, 174; 226/25

[56] References Cited

UNITED STATES PATENTS

| | | | |
|---|---|---|---|
| 1,988,980 | 1/1935 | Debrie | 226/25 X |
| 3,025,751 | 3/1962 | Braun | 226/25 UX |

*Primary Examiner*—Richard A. Schacher
*Attorney*—John Lezdey

[57] ABSTRACT

In an optical-electronic scanning device wherein a control film is passed by film driving means and a film cassette, a means for reacting to excessive tension or pull which stops the driving means when a preselected tension is exceeded on the film.

8 Claims, 7 Drawing Figures

FILM-DRIVING ROLLER WITH DEVICE FOR STOPPING THE DRIVE MECHANISM IF THE FILM IS OVERLOADED

BACKGROUND OF THE INVENTION

The use of driving and scanning devices for films, magnetic tapes, punched tapes, and the like, and more particularly, driving and scanning devices for control films or punched tapes exhibiting, in regular order, transparent and opaque markings which are scanned, for the purpose of controlling the operation of machines, e.g. knitting machines, by means of an optical-electronic scanning system, and are converted into electrical signals whereby the said machines are controlled has been known for years.

According to prior art devices, the driving and scanning system contains a stationary, optical-electronic scanning device in front of which the control film is passed by means of two film-driving rollers arranged before or after the scanning station, and an interchangeable film cassette having a central aperture. The cassette of the prior art device is adapted to be fitted to a baseplate carrying the scanning device in a manner such as to surround the scanning device on all sides and the film therein being placed, through a gap open towards the said central aperture around the two film-driving rollers arranged in front of or behind the scanning station. Within the cassette, the film, which may be endless, is placed around a plurality of guide rollers mounted around the central aperture, depending upon its length.

In order to distribute the forces applied to the film by the drive over various locations on the film, two additional film-driving rollers are provided in the film cassette close to the film-entry and film-exit gaps, so that when the device is in operation the film forms two loops. The loop within the cassette is fully decoupled mechanically from the loop outside the cassette so that no transfer of force takes place between the two loops in the film.

OBJECT OF THE INVENTION

It is the object of the present invention to provide a driving roller mounted in front of the film-exit gap in a cassette for an optical-electronic scanning device in a reliable and simple manner, with a device which reacts to excessive tension or pull on the film, stopping the driving mechanism, and even the machine being controlled, whenever a preselected film tension is exceeded.

SUMMARY OF THE INVENTION

This invention relates to optical-electronic scanning systems. More particularly, this invention relates to means for reacting to excessive tension or pull on a film in a cassette used with a film driving optical-electronic scanning device used in controlling machines.

To this end, the invention is based on a driving roller forming a part of a film-driving system equipped with a plurality of driving means for a film provided with perforations, and containing at least one toothed disc engaging in the perforations in the film, and a drive shaft mounted in the said toothed disc and rotating at the same r.p.m. as the other drive shafts, the toothed disc being adapted to turn against the pressure of at least one compression means in relation to the drive shaft and a switch contact being provided which is open when the compression means is decompressed.

The invention is characterized in that one end of the compression means, which is preferably a spring, is firmly attached to a carrier pin fastened to the toothed disc rotating freely on the drive shaft, the other end of the compression means is attached to a hub fixed to the drive shaft; and in that the hub carries a pivotably mounted pawl which holds the switch contact closed when the compression means is decompressed and which is pivoted by the carrier pin, in order to open the said contact switch, by the load on the compression means resulting from excessive pull on the film.

DESCRIPTION OF THE PREFERRED EMBODIMENTS

Figure 1:
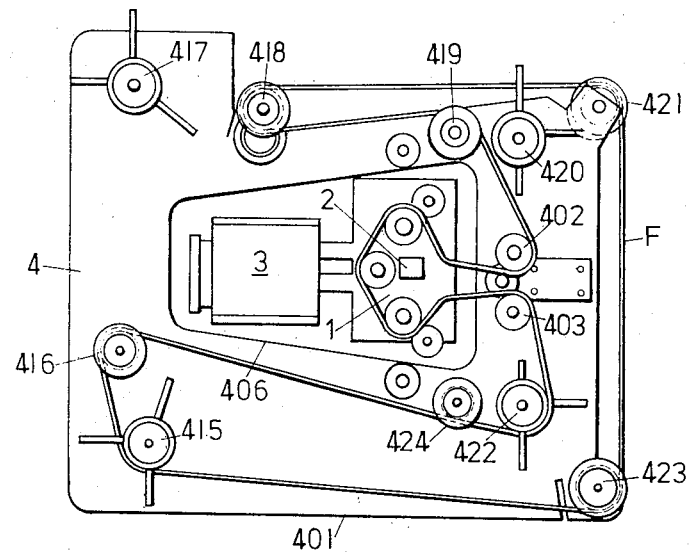
FIG. 1 is a plan view of a film-driving and scanning device.
Figure 2:
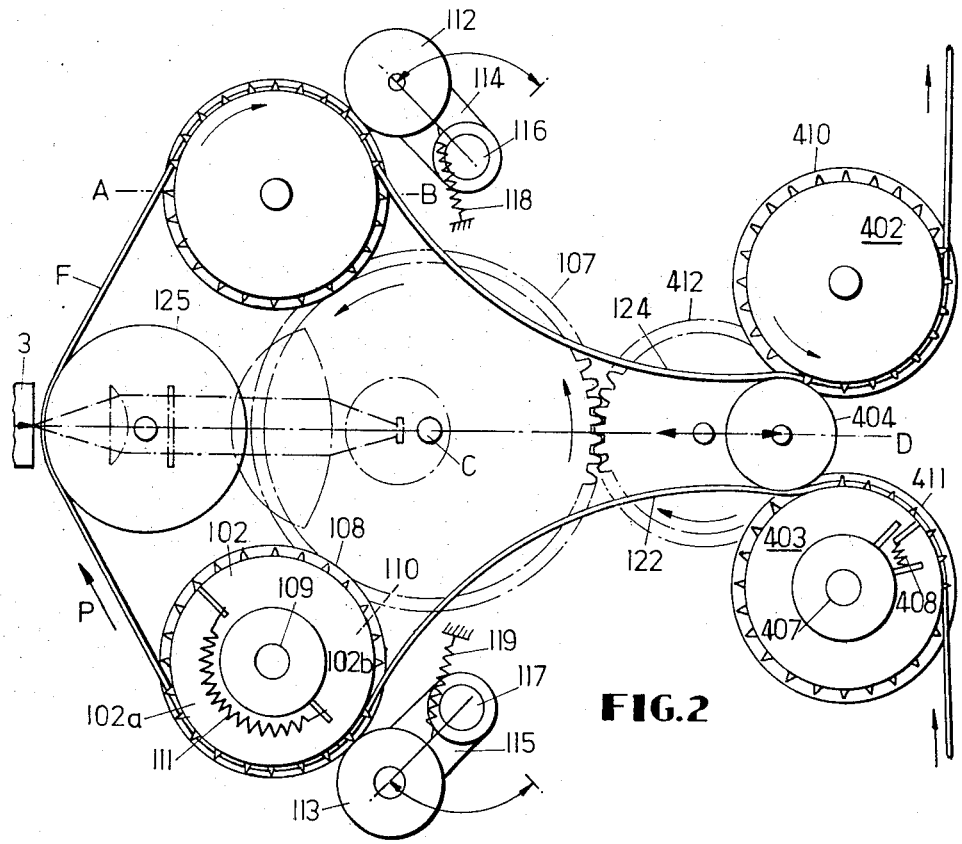
FIG. 2 shows a detail in FIG. 1 to an enlarged scale.

FIG. 1 shows a driving and scanning device for a control film F, or the like. The device as a whole consists essentially of four parts, namely a driving device 1, an optical system 2 having a source of light arranged behind the film F, a scanning or read-off device 3, arranged in front of film F, and an interchangeable film cassette 4 with additional film-driving rollers and guiding rollers.

Figure 3:
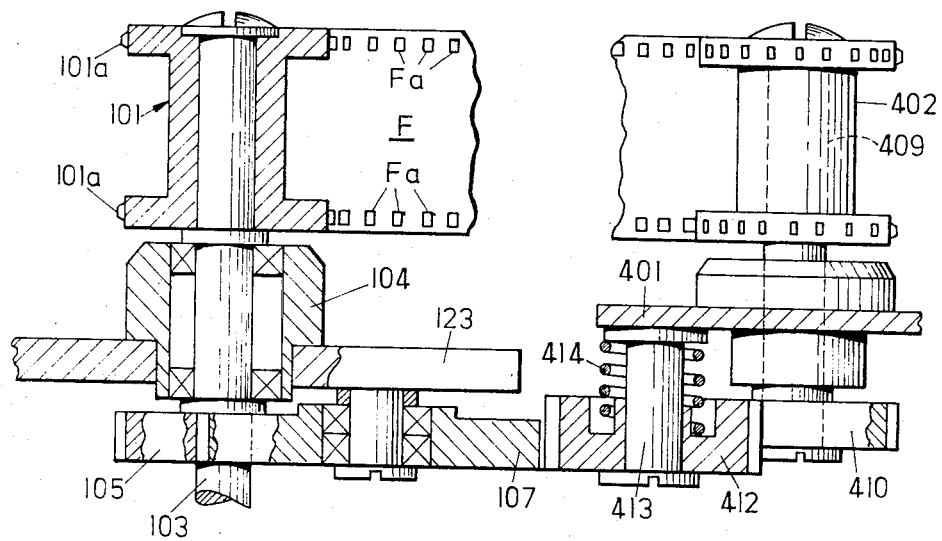
FIG. 3 is a section along the line ABCD in FIG. 2.

Devices 1, 2 and 3 are arranged on a stationary baseplate 123, film F running parallel with the surface of the baseplate 123 in the direction of arrow P. The film F is driven by two driving rollers 101, 102 provided with toothed discs 101a, 102a engaging in the perforations Fa in the edges of the film F. As shown in FIG. 3, driving roller 101 is attached to a shaft 103 running in a bearing 104 attached to baseplate 123. Below baseplate 123, shaft 103 is connected to a driving device (not shown) designed in such a manner, for example, that film F moves continuously or intermittently in time with a machine.

Just under baseplate 123, another gearwheel 105 is attached to shaft 103, the gear 105 engaging, through an idler 107, with a gearwheel 108 fixed to a shaft 109 to the upper end of which is attached driving roller 102, the shaft is mounted in a bearing 110 attached to baseplate 123.

Arranged just in front of, or just behind, driving rollers 101, 102 are pressure rollers 112, 113, the axes of which are seated on pivot levers 114, 115. The axes 116, 117 of pivot levers 114, 115 are mounted on baseplate 123. Pressure rollers 112, 113 are held in their operating or non-operating positions by the tension of helical springs 118, 119.

Arranged between the two driving rollers 101, 102 is a loose film-guiding roller 125, by means of which film F is fed past scanning or read-off device 3 at a specific distance therefrom.

Film cassette 4 contains a baseplate 401 of substantially rectangular cross section and having a central aperture 401. When cassette 4 is inserted and locked, baseplate 401 is somewhat above the surface of baseplate 123. Mounted on each side of the line of symmetry C–D are driving rollers 402, 403. Also provided is a pressure roller 404 which is adapted to move back and forth in the cassette in the direction of line of symmetry C–D for the purpose of changing the film and otherwise corresponds to pressure rollers 112, 113. Shaft 409 of driving roller 402, and shaft 407 of driving roller 403 are mounted in baseplate 401. Attached to the lower ends of shafts 409 and 407, below baseplate 401, are gearwheels 410, 411 engaging with an idler 412. The idler 412 rotates freely and is adapted to move axially upwards against the pressure of a spring 414 seated on a pin 413 in baseplate 401 and engaging with idler 107 on baseplate 123. When the film cassette is being changed, idler 412 may be pushed upwards.

Arranged on baseplate 401 of cassette 4 are freely rotating guiding rollers 415 to 424 located around central aperture 6 on pins perpendicular, or at an angle, to the surface of the plate. Film F is placed around the guiding rollers 415 to 424 in accordance with its length.

In order that the loop of film within cassette 4 is not damaged or broken by excessive pull on the film, driving roller 403 arranged immediately in front of the exit gap in cassette 4 is preferably provided with a device whereby the entire drive device is stopped when an excessive pull is applied to the film. According to one preferred embodiment of the invention, a toothed film roller 403a is mounted to rotate freely on shaft 407. Shaft 407, which is mounted in baseplate 401 of the cassette, is in communication, via gearwheel 411 attached to the shaft, idler gear 412, and idler gear 107, with the drive device 47 (FIGS. 4 and 6) for all driving wheels, and is in the form of a hollow shaft 407. Also seated on shaft 407 is a hub 17 which moves neither axially nor radially on the shaft 407. Attached to film roller 403a is a pin 15 projecting into a cavity 28 between film roller 403a and hub 17. Attached to pin 15 is one end of a compression spring 29, the other end thereof being attached to hub 17.

Figure 4:
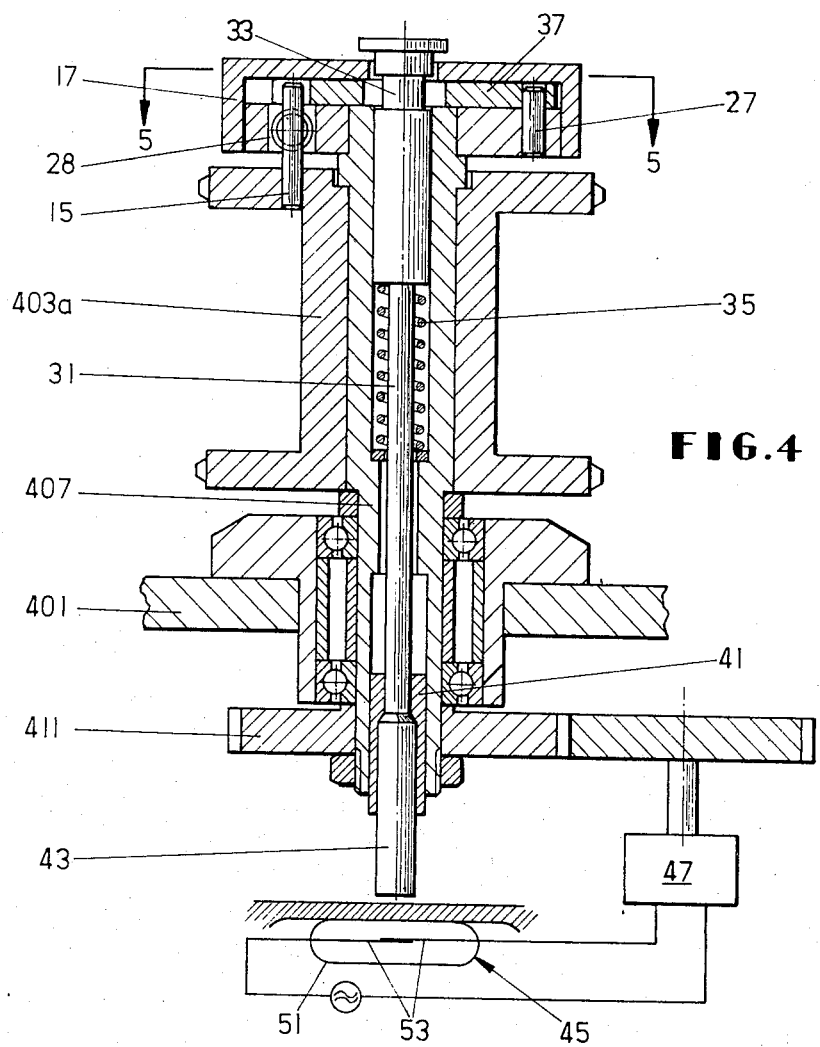
FIG. 4 is a section through the driving roller according to the invention, with the film under normal tension.
Figure 5:
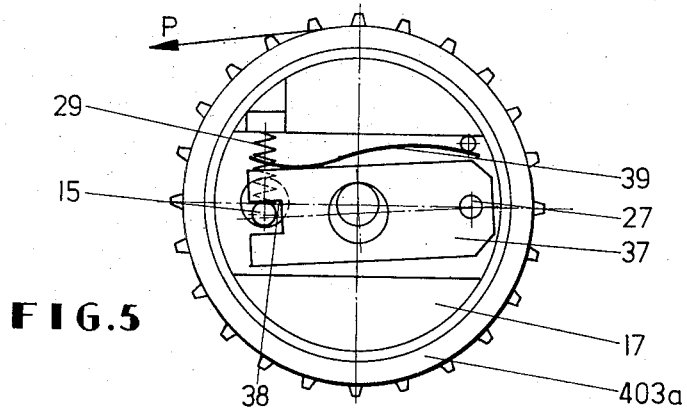
FIG. 5 is a section along the line 5—5 in FIG. 4.

Mounted in hollow shaft 407 is an axially displaceable rod 31, the upper end of which has a groove 33, as shown in FIG. 4. Placed around a central part of rod 31 is a spring 35, one end of which rests against a projection on rod 31, while the other end rests against a projection on drive shaft 407. Thus in its normal position, with spring 35 decompressed, rod 31 is pushed upwards.

Pivotably mounted on a pin 27 of hub 17 is a pawl 37 which is pressed against rod 31 by means of a leaf spring 39, one end of which is attached to hub 17 while the other end rests against pawl 37.

Figure 6:
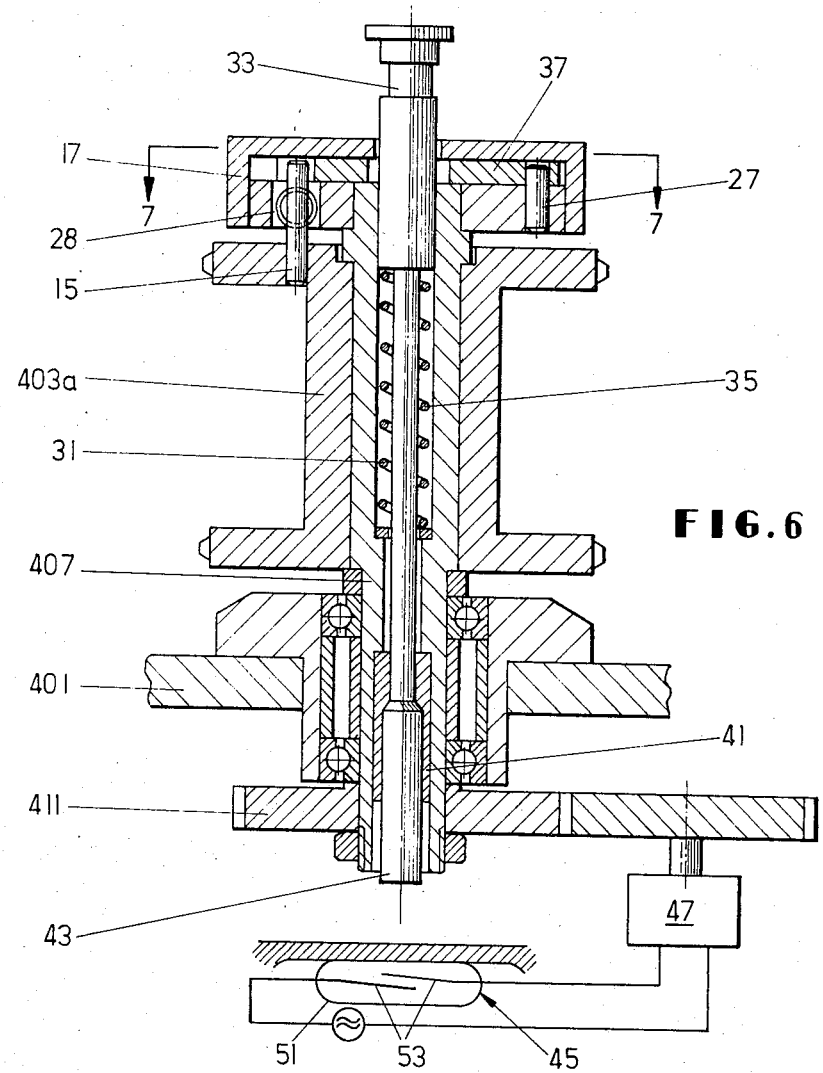
FIG. 6 is a section through the driving roller according to FIG. 4, with the film under excessive tension.
Figure 7:
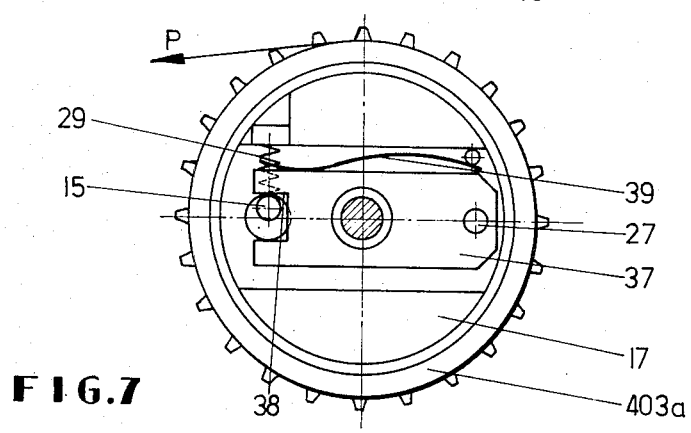
FIG. 7 is a section along the line 7—7 in FIG. 6.

Attached to the lower end of rod 31 is a magnet holder 41 into which a small permanent magnet 43 is fixed. The magnet 43 cooperates with a switch contact 45, which may be wired into the electrical circuit of a motor for the drive device 47 (FIGS. 4 and 6).

The driving roller operates as follows:

When shaft 407 is driven in order to feed the film placed on film roller 403a in the direction of arrow P, film roller 403a is carried along by compression spring 29 which is set to a specific pressure, for example 2000 p. Under these circumstances, pin 15 is not engaged with pawl 37, and the pawl 37 is therefore being pressed by leaf spring 39 against rod 31. In order to keep switch contact 45 closed, the rod 31 is pressed downwards (FIG. 4) until pawl 37 engages in groove 33.

Now, if as a result of contamination or contraction of the film loop within the cassette, a pull of specific magnitude is exerted upon the film, for example in the case of a 2000 p spring a pull of 1200 p, then film roller 403a will be rotated in relation to shaft 407 against the direction of travel of film F and against the force of compression spring 29. As a result of this, pin 15 attached to the compression spring 29 will be pressed against a stop 38 on pawl 37. This forces the pawl 37 out of groove 33 in rod 31, and rod 31 is pushed upwards by spring 35 into the position shown in FIG. 6. The drive device is thus stopped.

After the defect in cassette 4 has been corrected and the normal pull on the film has been restored, film roller 403a is rotated by spring 29 back to its normal position, in which pin 15 is no longer pressed against pawl 37. Rod 31 may now be lowered again and the pawl 37 may be engaged in groove 33 again.

Switch contact 45 may be a Reed contact, for example, consisting of a glass tube 21 into which are fused two weakly magnetic contact tongues 53. These tongues are brought into contact with each other by the magnetic field of permanent magnet 43 when the latter is in its lowermost position (FIG. 4). On the other hand, when the magnet 43 is in its uppermost position (FIG. 6), the force of its field is no longer sufficient, and contact tongues 53 therefore snap back into their position of rest, thus opening the circuit to motor 47.

The effect of the driving roller according to the invention is that film F can be driven only as long as the tension in the piece of film within the cassette 4 remains below a preselected value determined by compression spring 29. Also retained is the advantage that the film loop outside cassette 4 is mechanically decoupled from the film loop inside cassette 4. The tension of the film between driving rollers 101 and 102, and 102 and 104, on the one hand, and 403 and 101 on the other hand, has no effect on the operation of driving roller 403.

The driving roller described is particularly suitable for film-driving and scanning devices of the type having a drive shaft arranged in front of the scanning device in the direction of travel of the film in the form of a film-tensioning roller which stops the scanning and feeding device if the film tears or is under too little tension. If a tensioning roller of this kind is used in conjunction with the driving roller according to this invention, the device driving the control film will be stopped when the film breaks anywhere between rollers 101 and 102, and also when the film tension within cassette 4 becomes too high for any reason whatever. There is no danger of excessive film tension or breaks between rollers 403 and 101 since in this area the film may be allowed to sag loosely.

Obviously, the embodiment shown is exemplary only and a wide variety of embodiments may be devised without departing from the spirit and scope of the invention.

What is claimed is:

1. In a film driving system having a baseplate and a plurality of means mounted for driving a film with perforations, a pressure sensitive drive means for stopping said film when a pre-selected tension is exceeded comprising at least one resilient compression means, a toothed member mounted on a drive shaft adapted to rotate against the pressure of said compression means, said compression means having one end connected to a pin on said baseplate and the other end connected to a hub on said drive shaft, switch means normally in a closed position, and a pawl pivotably mounted on said hub adapted to hold said switch means in a closed position so that when a preselected tension is exceeded on said film said compression means is decompressed and said pawl is pivoted and said switch contact is open to deactivate driving of said film.

2. The system according to claim 1 wherein said compression means is a compression spring.

3. The system according to claim 1 wherein said pawl is pressed against said drive shaft of said pressure sensitive drive means by a leaf spring being spaced from said pin when said compression means is decompressed, but being moved away from said drive shaft by said pin, against the force of said leaf spring, when said compression spring is compressed.

4. The system according to claim 1 wherein said drive shaft is hollow and mounted displaceably in said drive shaft by a spring, is a grooved rod actuating said switch means whereby said rod after being displaced against the force of said spring by means of said pawl engaging in the groove of said rod is capable of being locked in position and brought into a second position when the tension in the film is too high by said pawl being forced out of said groove by said compression means.

5. A system according to claim 4 including a permanent magnet attached to one end of said rod (31), said magnet holding said switch means closed in one position of said rod, and holding said switch means open in the other position of said rod.

6. The system according to claim 1 wherein said system is in a film cassette.

7. The system according to claim 1 which includes a plurality of drive shafts having toothed discs for driving said film, all of said drive shafts rotating at the same speed.

8. The system according to claim 1 including a pressure roller mounted on said baseplate capable of moving in a reciprocating motion so as to change the film.

* * * * *